(12) United States Patent
Padfield et al.

(10) Patent No.: US 7,817,841 B2
(45) Date of Patent: Oct. 19, 2010

(54) TIME-LAPSE CELL CYCLE ANALYSIS OF UNSTAINED NUCLEI

(75) Inventors: Dirk Ryan Padfield, Albany, NY (US); Thomas Baby Sebastian, Flemington, NY (US); Jens Rittscher, Ballston Lake, NY (US); Nicholas Thomas, Radyr Cardiff (GB)

(73) Assignee: General Electric Company, Niskayuna, NY (US)

( * ) Notice: Subject to any disclaimer, the term of this patent is extended or adjusted under 35 U.S.C. 154(b) by 894 days.

(21) Appl. No.: 11/589,001

(22) Filed: Oct. 27, 2006

(65) Prior Publication Data

US 2007/0109874 A1 May 17, 2007

Related U.S. Application Data

(60) Provisional application No. 60/736,345, filed on Nov. 12, 2005.

(51) Int. Cl.
*G06K 9/00* (2006.01)
*G06T 17/00* (2006.01)

(52) U.S. Cl. ..................................................... 382/133

(58) Field of Classification Search .................. 382/133
See application file for complete search history.

(56) References Cited

U.S. PATENT DOCUMENTS

| | | | |
|---|---|---|---|
| 4,523,278 | A | 6/1985 | Reinhardt et al. |
| 5,162,990 | A | 11/1992 | Odeyale et al. |
| 5,548,661 | A | 8/1996 | Price et al. |
| 6,681,035 | B1 | 1/2004 | Bamford et al. |
| 2002/0081013 | A1 | 6/2002 | Raz |
| 2002/0141631 | A1 | 10/2002 | Vaisberg et al. |
| 2002/0154798 | A1 | 10/2002 | Cong et al. |
| 2002/0172406 | A1 | 11/2002 | Rouet et al. |
| 2003/0169946 | A1 | 9/2003 | Bamford et al. |
| 2003/0184730 | A1* | 10/2003 | Price .......................... 356/39 |
| 2004/0029213 | A1 | 2/2004 | Callahan et al. |
| 2004/0071328 | A1 | 4/2004 | Vaisberg et al. |
| 2004/0114800 | A1* | 6/2004 | Ponomarev et al. ......... 382/173 |
| 2005/0002552 | A1 | 1/2005 | Dunn et al. |

(Continued)

FOREIGN PATENT DOCUMENTS

EP 0614153 A2 9/1994

(Continued)

OTHER PUBLICATIONS

Alexandre Dufour et al., Segmenting and Tracking Fluorescent Cells in Dynamic 3-D Microscopy With Coupled Active Surfaces, IEEE Transaction on Image Processing, vol. 14, No. 9, Sep. 2005, pp. 1396-1410.*

(Continued)

*Primary Examiner*—Brian P Werner
(74) *Attorney, Agent, or Firm*—Fletcher Yoder (57) ABSTRACT

The present invention provides a cell imaging technique for automatically tracking the progression of a cell through the cell cycle over time through segmentation of a volume of two-dimensional time-lapse images. The technique allows long-term tracking of the cell cycle progression of an individual cell or multiple cells. Further, the invention provides a unique display of cell cycle progression, allowing an end user to easily determine changes to cell cycle progression for a cell of interest.

44 Claims, 9 Drawing Sheets

U.S. PATENT DOCUMENTS

| | | | |
|---|---|---|---|
| 2005/0058345 A1 | 3/2005 | Koide et al. |
| 2005/0163373 A1 | 7/2005 | Lee et al. |
| 2005/0202404 A1 | 9/2005 | Wittenburg et al. |
| 2005/0207633 A1 | 9/2005 | Arini et al. |
| 2005/0273271 A1 | 12/2005 | Rao et al. |
| 2006/0039593 A1 | 2/2006 | Sammak et al. |
| 2006/0247862 A1 | 11/2006 | Arini et al. |

FOREIGN PATENT DOCUMENTS

| | | | |
|---|---|---|---|
| EP | 0365928 B1 | 5/1995 |
| EP | 1615170 A1 | 1/2006 |
| GB | 2412803 A | 10/2005 |
| WO | WO2004021260 A1 | 3/2004 |
| WO | 2004088573 | 10/2004 |
| WO | WO2006047502 A2 | 5/2006 |

OTHER PUBLICATIONS

Ray, N. et al., "Data Acceptance for Automated Leukocyte Tracking Through Segmentation of Spatiotemporal Images", IEEE Transactions on Biomedical Engineering,, vol. 52, No. 10, Oct. 2005, pp. 1702-1712.

PCT Search Report dated Feb. 11, 2007.

Vassili Kovalev et al. "Feature Selection Evaluating Fluorescence Microscopy Images in Genome-Wide Cell Screens", Proc. IEEE Computer Society Conference on Computer Vision and Pattern Recognition (CVPR'06), 8 pgs.

N. Harder et al. "Automated Recognition of Mitotic Patterns in Fluorescence Microscopy Images of Human Cells", IEEE Internat. Symposium on Biomedical Imaging: From Nano to Macro (ISBI'2006), pp. 1016-1019.

Fuxing Yang et al. "Cell Segmentation, Tracking, and Mitosis Detection Using Temporal Context", MICCAI, 2005, pp. 302-309.

Nilanjan Ray et al. "Data Acceptance for Automated Leukocyte Tracking Through Segmentation of Spatiotemporal Images", IEEE Transactions on Biomedical Engineering, vol. 52, No. 10, Oct. 2005, pp. 1702-1712.

Dipti Prasad Mukherjee et al. "Level Set Analysis for Leukocyte Detection and Tracking", IEEE Transactions on Biomedical Engineering, vol. 13, No. 4, Apr. 2004, pp. 562-572.

Xiaowei Chen et al. "Automated Segmentation, Classification, and Tracking of Cancer Cell Nuclei in Time-Lapse Microscopy", IEEE Transactions on Biomedical Engineering, vol. 53, No. 4, Apr. 2006, pp. 762-766.

Xiaobo Zhou et al. "Time-Lapse Cell Cycle Quantative Data Ananlysis Using Gaussian Mixture Models", in the Book "Life Science Data Mining", Eds S.T.C. Wong and C.S. Li, *World Scientific*, 2006.

Amersham Biosciences Part of GE Healthcare "G1S Cell Cycle Phase Marker Assay-User Manual", 25-9003-97UM, Rev A, 2005, Chpts. 1-11.

Dirk Padfield et al. "Spatio-Temporal Cell Cycle Phas Analysis Using Level Sets and Fast Marching Methods", Microscopic Image Analysis with Applications in Biology (MIAAB) MICCAI 2006 Workshop, Copenhagen, Denmark, Oct. 2006, pp. 1-8.

Dirk Padfield et al. "Time-Lapse Cell Cycle Analysis Using 3D Segmentation of Unstained Nuclei in Line Scan Confocal Fluorescence Images", 2006 IEEE International Symposium on Biomedical Imaging: From Nano to Macro, Apr. 2006, pp. 1-17.

EP Office Action, Application No. 06 850 118.8-2218 mailed May 11, 2010.

* cited by examiner

TIME-LAPSE CELL CYCLE ANALYSIS OF UNSTAINED NUCLEI

CROSS REFERENCE TO RELATED APPLICATIONS

This application is a Non-Provisional Application of Provisional Patent Application No. 60/736,345, entitled "TIME-LAPSE CELL CYCLE ANALYSIS USING THREE-DIMENSIONAL SEGMENTATION OF UNSTAINED NUCLEI IN LINE SCAN CONFOCAL FLUORESCENCE IMAGES", filed Nov. 12, 2005, which is herein incorporated by reference.

BACKGROUND

The present technique relates generally to image analysis designed to determine the cell cycle phase of a particular cell. More specifically, the present technique relates to automatically segmenting a cell into a cell cycle phase using three-dimensional segmentation of two-dimensional time-lapse images.

When eukaryotic cells replicate, they pass through a tightly regulated series of events known as the cell cycle. The cell cycle generally includes four phases: G1, S, G2, and M. Each phase of the cell cycle is marked by distinctive characteristics in cell morphology and total DNA content as the DNA is replicated and the cell splits into two daughter cells.

In basic research and in drug discovery work, valuable information can be obtained by understanding how an agent affects the growth and division of cells. Often, this information gives some indication of the mechanism of action associated with the compound. For example, a particular class of drugs or genetic manipulations may arrest cell growth at the G2 stage (second gap phase) and may act via a particular set of mechanisms or actions. Another class of drugs or genetic manipulations may arrest cells while in mitosis, and thus may act via a different mechanism. The ability to quickly determine whether a population of cells is blocked or arrested in G2 or mitosis (or some other stage) provides a valuable tool in assessing the mechanism of action of an uncharacterized compound that has been tested on the population of cells. This is particularly useful in the study and treatment of cancer, since it is desirable to identify compounds that block the replication of rapidly proliferating cancer cells without perturbing normal cells. Further, it is also useful to determine if an uncharacterized compound has the effect of increasing progression through the cell cycle, because such a compound may be potentially carcinogenic.

Typically, cell cycle progression is assessed by image analysis of fluorescent cellular images. Such analysis may involve staining cells with a nuclear dye, generally a fluorescent dye, to identify cell nuclei to provide a reference point for cell segmentation and other image analysis procedures. The common use of fluorescent dyes presents barriers for long-term cellular imaging. For example, nuclear dyes rely on binding in one way or another to DNA in order to adequately stain the cells. While such dyes may be suitable for fixed cell assays or for live assays of short duration (e.g. several hours), fluorescent dyes have toxic side effects that prevent long-term studies. If cells are stained with a nuclear dye and cultured for extended periods, they die, either because they cannot replicate their DNA when it is intercalated with dye, or because the dye interferes with chromosome segregation during mitosis.

An alternative method to stain nuclei and keep cells alive through more than one cell cycle is to engineer the cell to express a fluorescent protein such as Green Fluorescent Protein (GFP) that is coupled to a nuclear localization sequence so the protein acts as a nuclear stain. Although GFP staining does not interfere with DNA replication in the same manner as intercalating fluorescent dyes, this approach involves genetic manipulation of the cells. This approach also does not distinguish among the various phases of the cell cycle. More specifically, a GFP protein marker may differentially stain cells in various phases of mitosis (e.g. prophase, metaphase, anaphase, and telophase), but the marker does not distinguish among the three phases of interphase: G1, S, and G2.

In addition to staining methods that do not interfere with long-term progression through the cell cycle, there is a need for rapid and automatic assessment of such stained cells. As much basic research and drug discovery is conducted on a "high-throughput" basis, manual assessment of stained cell images for long-term studies is intractable. For example, a cell assay well may have several hundred cells that may be monitored several times per hour over several days. In addition, for each agent or potential therapeutic compound studied, several wells may be prepared to provide statistically significant results. Therefore, there exists a need for techniques allowing the reliable, accurate, and automatic determination of cell cycle progression.

BRIEF DESCRIPTION

Generally, this invention relates to image analysis techniques and devices facilitating image analysis. It also relates to machine-readable media on which is provided instructions, data structures, etc. for performing the processes of this invention. In accordance with the present techniques, images of cells may be assessed by the use of specific algorithms. Using those analyzed images, the devices of this invention may automatically draw conclusions about the cell cycle phase of a cell over time. The present techniques may be also be used to generate processed image results, such as trees or other appropriate displays, that may graphically depict the progression of one or more cells through the cell cycle over time.

In accordance with one aspect of the present invention, a technique is provided for automatically tracking a cell cycle phase of a cell that includes the steps of generating a three-dimensional volume from a plurality of two-dimensional images of one or more cells; and performing a segmentation analysis of the three-dimensional volume to classify the one or more cells into a G1, S, G2, or M cell cycle phase over time.

In accordance with another aspect of the present invention, a computer readable medium is provided for automatically tracking a cell cycle phase of a cell comprising: code for generating a three-dimensional volume from a plurality of two-dimensional images of one or more cells; and code for performing a segmentation analysis of the three-dimensional volume to classify the one or more cells into a G1, S, G2, or M cell cycle phase over time.

In accordance with yet another aspect of the present invention, an image analysis system is provided for automatically tracking a cell cycle phase of a cell that includes: an imager; a processor adapted to receive a plurality of two-dimensional images of one or more cells from the imager, the processor adapted to run instructions for: generating a three-dimensional volume from the plurality of two-dimensional cell images; and performing a segmentation analysis of the three-dimensional volume to classify the one or more cells into a G1, S, G2, or M cell cycle phase over time.

In accordance with yet another aspect of the present invention, a technique is provided for screening the effect of a compound on cell cycle progression including the steps of:

treating one or more cells with the compound; generating a three-dimensional volume from a plurality of two-dimensional images of the one or more cells; performing a segmentation analysis of the three-dimensional volume to characterize the progression of the one or more cells into a G1, S, G2, or M cell cycle phase over time; and comparing the progression with a control.

In accordance with yet another aspect of the present invention, a computer readable medium is provided for displaying progression of a cell cycle phase of a cell that includes: code for generating a three-dimensional volume from a plurality of two-dimensional images of one or more cells; code for performing a segmentation analysis of the three-dimensional volume to classify the one or more cells into a G1, S, G2, or M cell cycle phase over time; code for performing a linking analysis of the G1, S, G2, or M cell cycle phases of the one or more cells; and code for displaying an image including the G1, S, G2, or M cell cycle phase of the one or more cells over time.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the field of medicine it is often desirable to be able to track the progress of a cell through different phases of the cell cycle. Generally, the cell cycle may be divided into four distinct phases. DNA in the cell nucleus is replicated during the "S" phase of the cell cycle (for "synthesis"). The entire cell-division phase is denoted as the "M" phase (for "mitosis"). This leaves the period between the M phase and the start of DNA synthesis (the S phase), which is called the "G1" phase (first gap phase), and the period between the completion of DNA synthesis and the next M phase, which is called the "G2" phase. Interphase is a term for the non-mitotic phases of the cell cycle, and includes G1, S, and G2 phases. In a typical cell, interphase may comprise 90% or more of the total cell cycle time. However, in cells that have been treated with one or more cell cycle altering compounds or agents and/or a cell-cycle altering stimulus (e.g. irradiation), normal progress through the cell cycle may be blocked, so that the relative time spent in a particular cell cycle phase is much longer compared to untreated cells. Thus, one method of assessing the effect of a known or putative cell cycle altering agent or compound is to examine the cell cycle progression for a population of cells that have been treated with the compound. Cell cycle progression in live cells may be assessed automatically via the imaging techniques and devices provided herein.

In order to generate information about the progress of a cell through the cell cycle, the present techniques track cellular changes over time. Standard tracking approaches generally assume either that the appearance of the objects or the trajectory are not changing. However, during the cell cycle, both the appearance and the trajectory of the cells change with time. Therefore, it is difficult to approach the problem using standard tracking techniques. The present techniques consider two-dimensional image slices taken over time as a spatiotemporal volume and then segment the nuclei in this volume in order to classify the cells within the various phases of the cell cycle.

Figure 1:
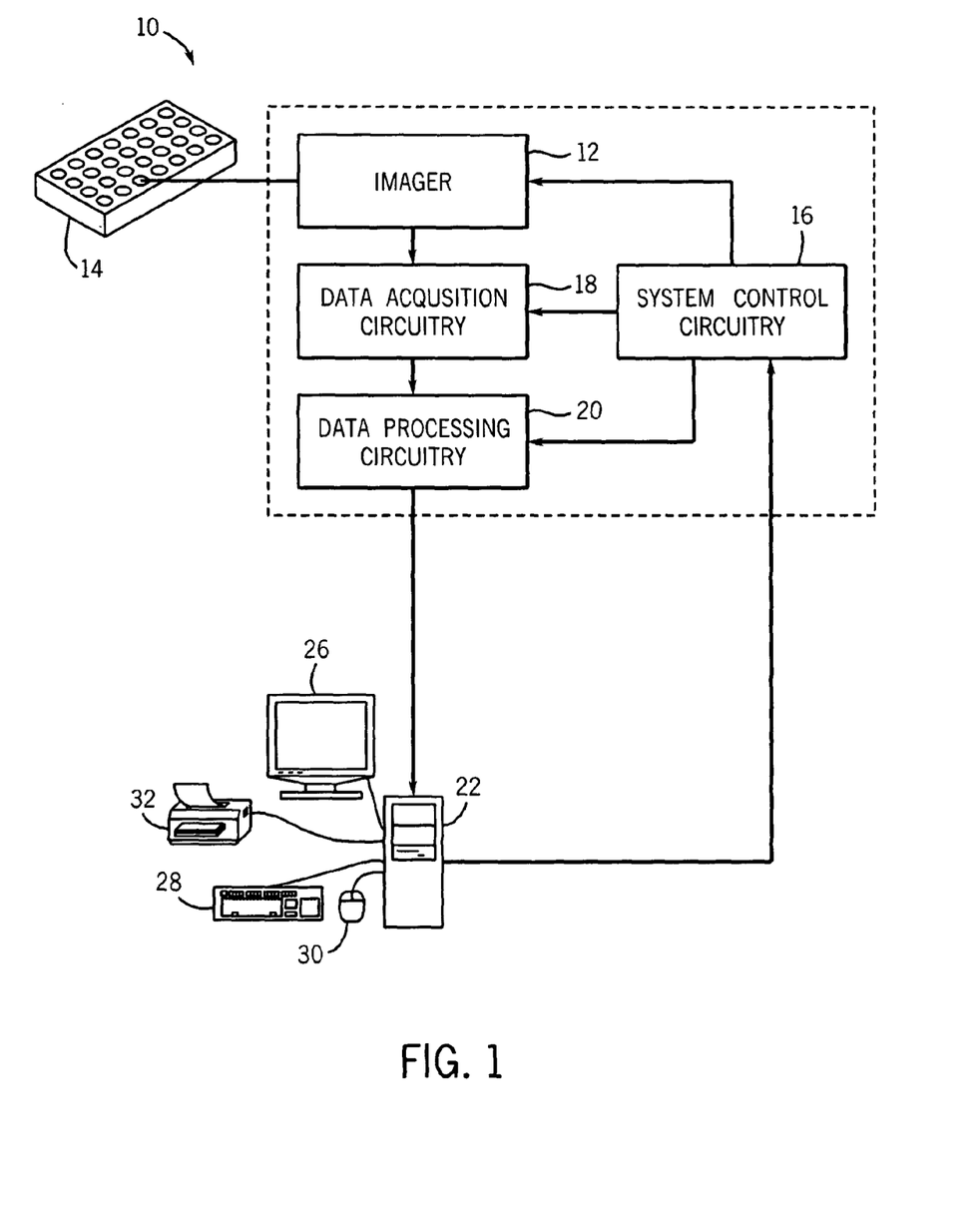
FIG. 1 is a diagrammatical view of an exemplary system for use in acquiring image data of cells in accordance with aspects of the present technique.

An exemplary imaging system 10 capable of operating in accordance with the present technique is depicted in FIG. 1. Generally, the imaging system 10 includes an imager 12 that detects signals and converts the signals to data that may be processed by downstream processors. As described more fully below, the imager 12 may operate in accordance with various physical principles for creating the image data. In general, however, the imager 12 creates image data indicative of a population of cells 14, shown here as being grown in a multi-well culture plate, either in a conventional medium, such as photographic film, or in a digital medium.

The imager 12 operates under the control of system control circuitry 16. The system control circuitry 16 may include a wide range of circuits, such as radiation source control circuits, timing circuits, circuits for coordinating data acquisition in conjunction with sample movements, circuits for controlling the position of radiation sources and detectors, and so forth. In the present context, the system control circuitry 16 may also include memory elements, such as magnetic or optical storage media, for storing programs and routines executed by the system control circuitry 16 or by associated components of the system 10. The stored programs or routines may include programs or routines for performing all or part of the present technique.

Image data acquired by the imager 12 may be processed by the imager 12, for a variety of purposes, for example to convert the acquired data or signal to digital values, and provided to data acquisition circuitry 18. The data acquisition circuitry 18 may perform a wide range of processing functions, such as adjustment of digital dynamic ranges, smoothing or sharpening of data, as well as compiling of data streams and files, where desired.

The data acquisition circuitry 18 may also transfer acquisition image data to data processing circuitry 20, where additional processing and analysis may be performed. Thus, the data processing circuitry 20 may perform substantial analyses of image data, including ordering, sharpening, smoothing, feature recognition, and so forth. In addition, the data processing circuitry 20 may receive data for one or more sample sources, (e.g. multiple wells of a multi-well plate. The processed image data may be stored in short or long term storage devices, such as picture archiving communication systems, which may be located within or remote from the imaging system 10 and/or reconstructed and displayed for an operator, such as at the operator workstation 22.

In addition to displaying the reconstructed image, the operator workstation 22 may control the above-described operations and functions of the imaging system 10, typically via an interface with the system control circuitry 16. The operator workstation 22 may include one or more processor-based components, such as general purpose or application specific computers 24. In addition to the processor-based components, the operator workstation 22 may include various memory and/or storage components including magnetic and optical mass storage devices, internal memory, such as RAM chips. The memory and/or storage components may be used for storing programs and routines for performing the techniques described herein that are executed by the operator workstation 22 or by associated components of the system 10. Alternatively, the programs and routines may be stored on a computer accessible storage and/or memory remote from the operator workstation 22 but accessible by network and/or communication interfaces present on the operator workstation 22.

The operator workstation 22 may also comprise various input/output (I/O) interfaces, as well as various network or communication interfaces. The various I/O interfaces may allow communication with user interface devices, such as a display 26, keyboard 28, mouse 30, and printer 32, that may be used for viewing and inputting configuration information and/or for operating the imaging system 10. The various network and communication interfaces may allow connection to both local and wide area intranets and storage networks as well as the Internet. The various I/O and communication interfaces may utilize wires, lines, or suitable wireless interfaces, as appropriate or desired.

More than a single operator workstation 22 may be provided for an imaging system 10. For example, an imaging scanner or station may include an operator workstation 22 which permits regulation of the parameters involved in the image data acquisition procedure, whereas a different operator workstation 22 may be provided for manipulating, enhancing, and viewing results and reconstructed images.

Images of live cells may be detected, and the cells' progression through the various phases of the cell cycle may be assessed in a variety of ways. The imager 12 may be any suitable imaging device, including a fluorescence microscope, a confocal fluorescence microscope, a laser scanning confocal microscope, or a total internal reflection fluorescence microscope. In a specific embodiment, the imaging system 10 may include an IN Cell Analyzer 1000 or an IN Cell Analyzer 3000 (GE Healthcare) using, for example, 488 nm excitation and a 535 nm emission filter for cells expressing Green Fluorescent Protein (GFP) growing in 96 well plates and maintained on the instrument throughout the duration of imaging under standard culture conditions (37° C./5% C02).

The cells 14 may be any appropriate cell type. Cells that may be imaged may include mammalian cells, human cells, immortalized cell lines, hyperproliferative cells, cancer cells, vascular smooth muscle cells, endothelial cells, stem cells, gametes, etc. As noted above, the cells 14 may be grown in any appropriate cell culture media. Further, the cells 14 may be grown in varied conditions. Aliquots of cells from a single source or cells from multiple sources may be processed in parallel, wherein the cells are subjected to the same or varied stimuli (e.g. exposure to a chemical agent). Thus, multiple cell samples may be processed in a multi-well plate, wherein some wells include compounds, such as putative therapeutic compounds, while other wells contain no compound (i.e. control cells). In some embodiments, cells may be treated with known cell cycle blockers, such as Roscovitine or Nocodazole. The term "test compound" or "drug candidate" or "modulator" or grammatical equivalents as used herein describes any molecule, either naturally occurring or synthetic, e.g., protein, oligopeptide (e.g., from about 5 to about 25 amino acids in length), small organic molecule, polysaccharide, lipid, fatty acid, polynucleotide, oligonucleotide, etc., to be tested for the capacity to directly or indirectly affect the cell cycle. The test compound can be in the form of a library of test compounds, such as a combinatorial or randomized library that provides a sufficient range of compound structural diversity. Further, in some embodiments, cells may be genetically altered by "knocking out" or silencing specific genes. It may also be appropriate to assess the effect of the removal or alteration of particular genes on cell cycle progression.

In some embodiments, it may be useful to image a cell line that stably expresses a cell cycle phase marker that includes a detectable moiety linked to cellular component exhibiting one or more variable characteristics linked to the cell cycle. Thus, for example, the methods presented herein may be employed to study a cell line that has been transformed to express a fusion protein comprising GFP fused to the C-terminal PSLD domain of DNA Helicase B (available from GE Healthcare). A cell cycle phase marker is a fluorescent protein-based sensor that provides an indication of cell cycle status of individual cells in an asynchronous population. The helicase B domain of the fusion protein moves between nucleus and cytoplasm during cell cycle progression, thus creating different fluorescence patterns as the cell moves through the cell cycle. In G1 cells, nuclear fluorescence is greater than cytoplasmic fluorescence (N>C), while S phase cells have evenly distributed fluorescence (N=C) and G2 cells have bright cytoplasm with dark nuclei (C>N). The present techniques employ computer analysis algorithms for automatically segmenting nuclei based on this differential staining effect and generating simple and meaningful representations of the results.

Figure 2:
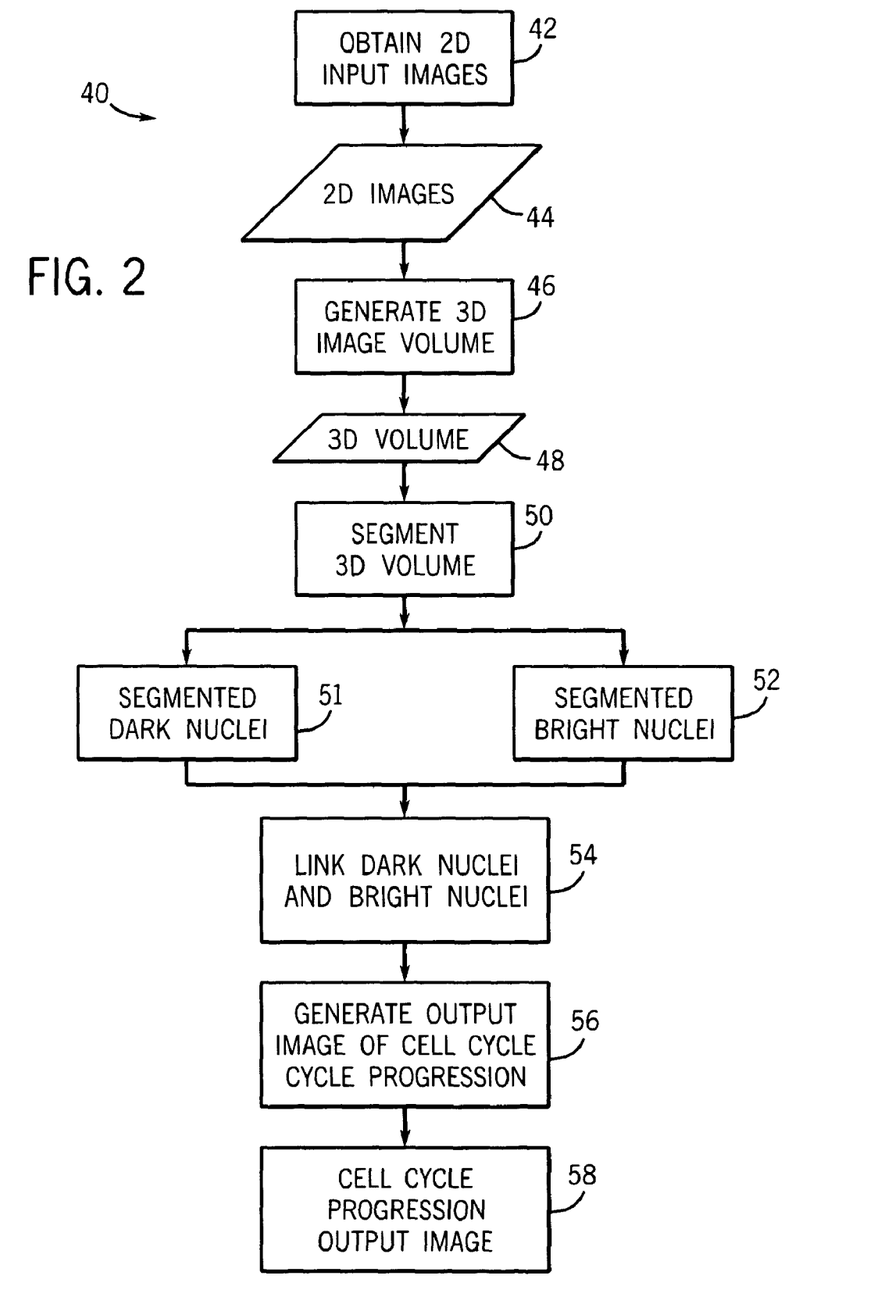
FIG. 2 is a flow chart depicting a process segmenting cell images in accordance with the present technique.

The computer analysis method 40 used to classify cells into various stages of the cell cycle is shown in FIG. 2. In step 42, the imaging system 10 obtains two-dimensional images 44 (see FIG. 3) of cells stained with an appropriate staining marker over time. Although the number of images and size of the images may vary, generally, the imaging system 10 may obtain a sufficient number of images over a sufficiently long amount of time to generate a three-dimensional image volume 48 in step 46. For example, an imaging system may obtain around 100 images of 1280*1280 pixels in size, each taken approximately 30 minutes apart. In step 50, the three-dimensional image volume is segmented into dark nuclei 51 and bright nuclei 52. The dark nuclei 51 are segmented using a three-dimensional implementation of level sets constrained with high curvature and strong attraction towards edges to prevent the evolving surface from leaking out of the nuclei into the background. The paradigm of the level set is that it is a numerical method for tracking the evolution of contours and surfaces. Instead of manipulating the contour directly, the contour is embedded as the zero level set of a higher dimensional function called the level-set function, $\psi(X, t)$. The level-set function is then evolved under the control of a differential equation. At any time, the evolving contour can be obtained by extracting the zero level-set $\Gamma((X), t) = \{\psi(X, t) = 0\}$ from the output. The main advantages of using level sets is that arbitrarily complex shapes can be modeled and topological changes such as merging and splitting are handled implicitly.

An exemplary level set equation is given by:

$$(d/dt)\psi = \alpha A(x)\cdot\nabla\psi - \beta P(x)|\nabla\psi| + \gamma Z(x)\kappa|\nabla\psi|$$

where A is an advection term, P is a propagation (expansion) term, and Z is a spatial modifier term for the mean curvature κ. The scalar constants α, β, and γ weight the relative influence of each of the terms on the movement of the interface.

In an alternate embodiment, the level set equation may be expressed as:

$$(d/dt)\psi = \alpha\nabla g\cdot\nabla\psi - \beta(\lambda g + (1-\lambda)s(D))|\nabla\psi| + \gamma g\kappa|\nabla\psi|$$

Here, g is a decreasing function of the image gradient, λ is a weighing parameter, and s(D) is described below. This function g results in a speed image that is close to 1 in areas of low gradient and close to 0 in areas of high gradient so that the level set slows down at the edges. The function g may be set based on a sigmoid function. If the level set leaks, it will proceed rapidly in the background, and, if allowed to propagate, the level set from these weak-edge nuclei can eventually join with other nuclei and result in unusable segmentations. In the present techniques, the advection force may be increased, which attracts the level set to edges, and leaking is substantially diminished. The constantly changing intensity profile of the dynamic cell cycle sensor frequently yields gradients inside the nucleus, therefore, a high advection force can cause the level set to become stuck in local minima inside of the nucleus. In embodiments in which there is no edge present at the border of the nucleus, and the advection force may not constrain the level set, a size constraint may be implemented, or the level set may incorporate prior knowledge of the nuclei locations.

A set of seed points may be used to initialize the three-dimensional level set evolution. A seed placement step employing a normalized cross-correlation with a template at multiple scales in combination with a set of low level features places seed points near the medial axis of a cell. Based on this observation, a model may be constructed of the location of the nuclear edge from a mapping of the distance function from the seeds that will affect the speed of the level set function. A sigmoid may be used for the mapping function because it results in smoothly varying speed values, and the parameters may be set so that the zero crossing of the speed function occurs at the expected nuclear size. The sigmoid function used may be:

$$s(D) = (2*1/(1+\exp(-(D-\beta)/\alpha))) - 1$$

where s(D) is the speed that depends on the distance D, β is set to the expected cell size, and α controls the slope of the curve. The scalar multiplication and subtraction factors lead to a function that yields speeds from 1 to −1. Thus, rather than updating the model at every iteration as some other methods do, it only needs to be calculated at the beginning, leading to increased computational efficiency. The sigmoid function described above may be applied to the propagation term of the level set equation to slow down this term as the level set expands. To incorporate this constraint into the level set equation, the equation may be balanced against the g edge function that is already multiplied by the propagation term. A variable λ may control the relative weight of these edge and distance forces. As λ increases, more weight is given to the edge function and less to the distance function.

Since the curvature and advection terms have not been affected by the sigmoid function, these terms may continue to regularize the curve and attract it to edges, respectively. Thus, in the presence of strong gradients, the advection force will take over as the level set evolves and lock onto the edges as before. However, in the presence of weak edges, the shape/size constraint will keep the level set from growing without bound.

The bright nuclei 52 are segmented using a region growing technique. As cells progress through the cell cycle, the intensity of the nucleus transitions from bright to dark and then back to bright again as the cells split into daughter cells. While the dark nuclei 51 are segmented using an implementation of level sets, bright nuclei 52 in the M and G1 phases are characterized by very bright image intensity, and these bright nuclei 52 may be segmented using a region growing method starting from a conservative threshold. The cells in the remaining S phase blend with the background and thus need to be bridged using three-dimensional spatial constraints.

The three-dimensional tracks of the segmented nuclei in the different phases are then combined using a linking algorithm in step 54, described in more detail below. To combine and bridge all of these phases, linking methods result in fully connected three-dimensional nucleus "trees" that describe the evolution of the cells through their cell cycles. The method thus enables the digital tracking of cell movement and division as well as cell cycle status, producing color coded (or otherwise visually coded) "trees" in step 56. From this output image 58, the spatial location, nuclear size (represented by the shape of the cross-section of the tree), and position of the cell in the cycle may be determined. The algorithm enables the user to track the history of cells in space and time in conjunction with measuring the output from any dynamic cellular marker (for example, GFP-based or other dynamic marker) in time across a population of cells, where each three-dimensional data "slice" comes from a separate frame of time lapse. The frame interval may be seconds, minutes, or hours, depending on the temporal characteristics of the sensor and the cellular process being studied. These embodiments of the disclosed techniques employing genetically introduced autofluorescent reporter constructs thus enable the automatic computer analysis of cell cycle over extended periods of time without necessitating the staining of the nucleus. Moreover, the general tracking methods provided herein enable the three-dimensional segmentation and representation of the various stages of the cell cycle. Such a three-dimensional representation of the cell cycle may allow a biologically relevant conclusion to be drawn from the imaging data. For example, the three-dimensional representation may allow visualization of perturbations of the cell cycle, which may allow conclusions to be drawn regarding the effectiveness of a particular therapeutic cell cycle blocking agent. Such visualization may be at the level of a population of cells, or at the level of a single cell within the population.

Figure 3:
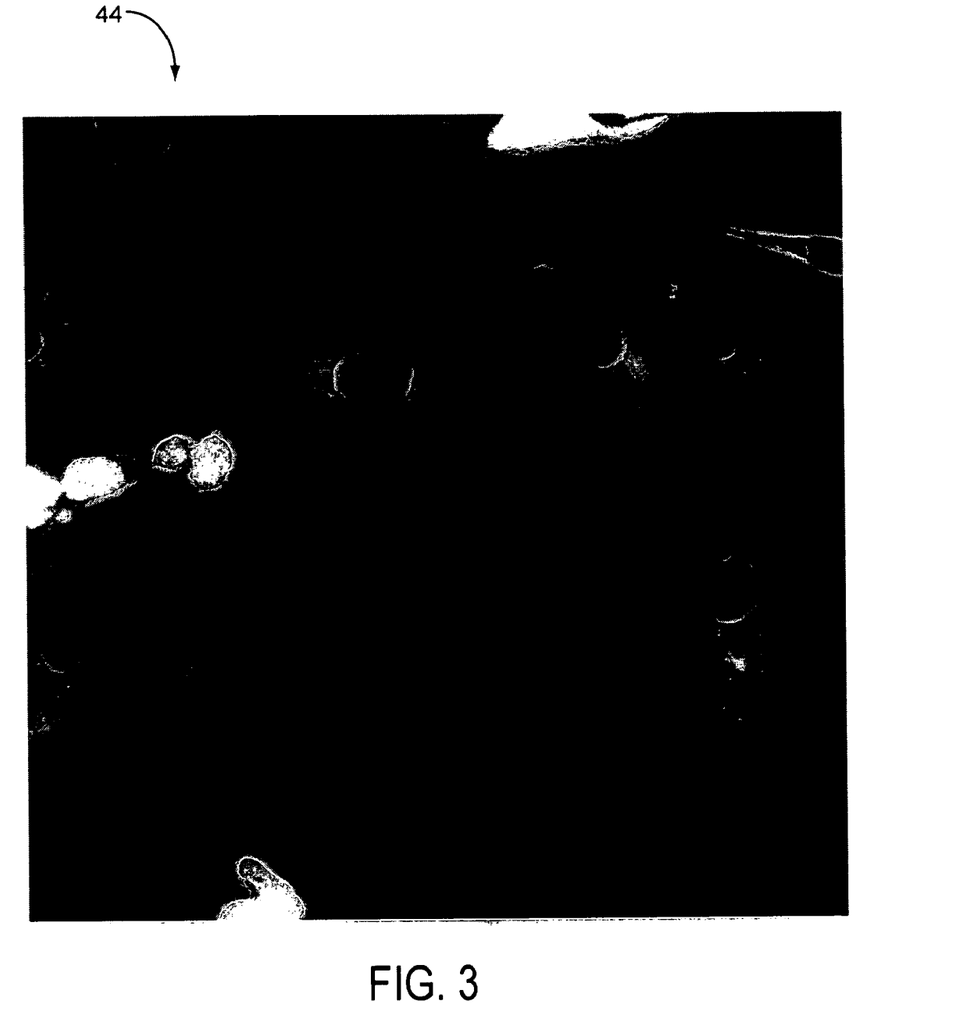
FIG. 3 is an exemplary two-dimensional cell image in accordance with the present technique.

FIG. 3 is an exemplary two-dimensional fluorescent cell image 44 that may be obtained from an imaging system 10 using the present techniques. Image analysis to achieve cell tracking and cell cycle analysis in the absence of a separate non-dynamic nuclear marker results in a change in fluorescence distribution through the cell cycle. The analysis procedure is capable of registering bright nuclei in G1 cells and inferring nuclear position from the "holes" left in the cytoplasm in G2 cells, shown as dark spots within a brightly stained cytoplasm.

Figure 4:
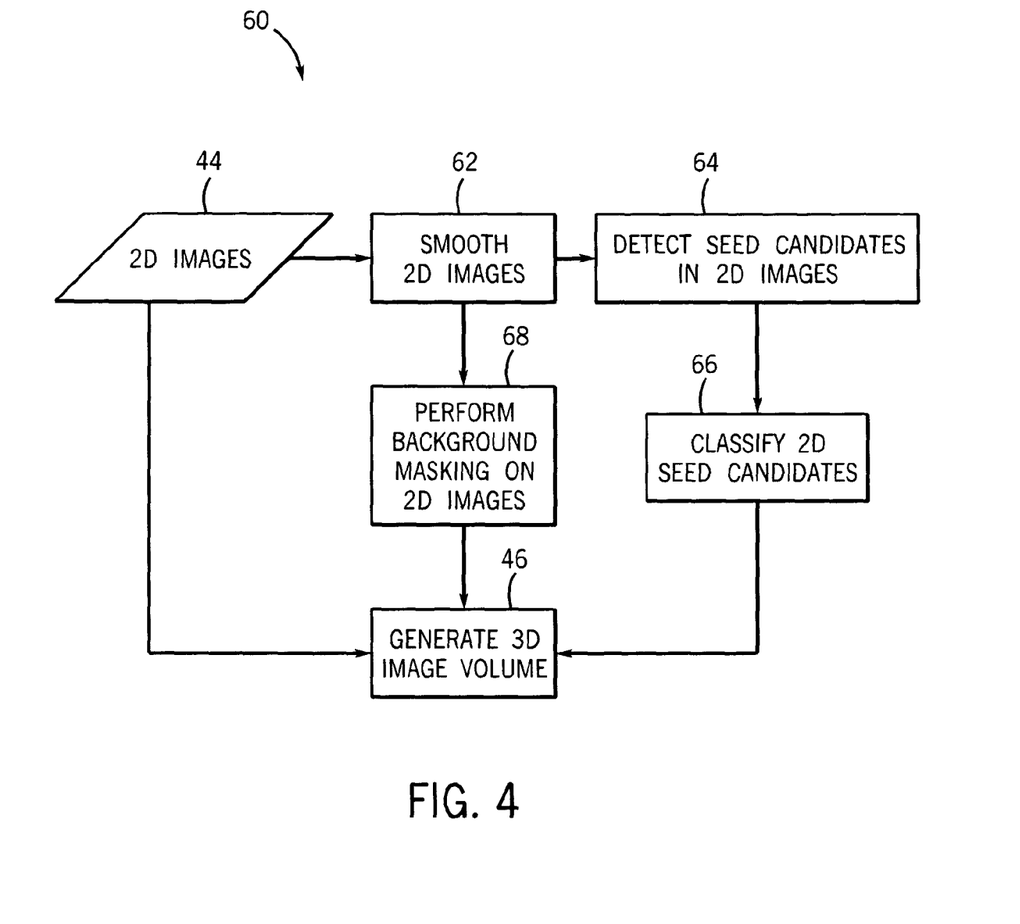
FIG. 4 is a flow chart depicting a process for generating a three-dimensional image volume in accordance with the present technique.

After a series of time-lapse two-dimensional images 44 has been obtained, the images 44 may be preprocessed to remove noise and identify nuclei seeds. FIG. 4 shows an exemplary preprocessing technique 60. First, the images 44 are smoothed using a level set smoothing algorithm in step 62. Then, seeds are automatically detected in step 64 using a normalized cross-correlation model of the nuclei followed by a seed classification step 66. The background is masked in step 68 using a combination of threshold, edge based, and curvature constraints to segment the majority of the background while avoiding the dark nuclei. The dark nuclei in the two-dimensional time-lapse images are then segmented (see FIG. 2) as a three-dimensional volume 48 using level set methods.

The images are first smoothed in two-dimensional space in step 62 using a curvature-based level set approach in order to remove spurious noise while retaining the edges of the nuclei. The method chosen for the smoothing is the modified curvature diffusion equation, which is a level set analog of the anisotropic diffusion equation. The equation for this type of smoothing is given by:

$$f_t = |\nabla f| \nabla \cdot c(|\nabla f|) \frac{\nabla f}{|\nabla f|}$$

where the conductance modified curvature term is:

$$k = \nabla \cdot \frac{\nabla f}{|\nabla f|}$$

In order to evolve a level set, initial seeds may first be defined in step 64. A two-step approach may be employed for two-dimensional seed creation: normalized cross correlation with a ring-like kernel followed by point classification. The normalized cross-correlation with a ring kernel that is positive inside the ring band, negative inside, and zero outside yields high correlation values for nuclei, which are dark structures surrounded by bright cytoplasm. Thresholding of the correlation image can thus effectively detect nuclei. However, step 64 may also yield several detections in the background since background segments surrounded by the cytoplasm of nearby cells look similar to the nuclei. To alleviate this issue, the point detection step may be followed by a seed point classification step 66 using edge curvature measures. First, a Canny-based edge detection step is carried out. The resulting edges are separated into those having positive curvature, negative curvature, and zero curvature. Then a set of training seed points are manually classified into the categories of strong nuclei, weak nuclei, and background from a training image. For each of the training points, a region of interest around the point is evaluated, and the number of edges with positive curvature as well as the magnitude of those edges is measured. The nuclei are classified with two measures because the edges around the nuclei generally have positive curvature because nuclei comprise dark structures surrounded by bright structures. Typically, the edges with positive curvature around the background are generally fewer in number and magnitude, and thus may not significantly effect the classification of the nuclei with positive curvature around the edges.

A Fisher linear discriminant classifier may be used to separate the scatter plot of seed points into nuclei versus background. Each training point is represented as a point in this classification scatter plot. The x-axis represents the sum of the number of positive curvature edges under the mask, and the y-axis represents the sum of the magnitude of these edges. Using this classification line, the automatically generated points from the normalized cross-correlation step for testing images are then classified.

A background masking algorithm, which captures most of the background, is used in step 68 to further remove candidate seeds and to prevent the three-dimensional "tunnel" level set from leaking into the background. Based on the image intensity characteristics, this algorithm thresholds the image with a conservative value to extract parts that are in the background but not in dark nuclei. The algorithm then grows these regions with a level set using a combination of an upper threshold with a gradient measure and curvature. With the smooth images, the seeds, and the masked background in place, the three-dimensional level set segmentation on the three-dimensional image volume 48, described in FIG. 2, may then be carried out.

Figure 5:
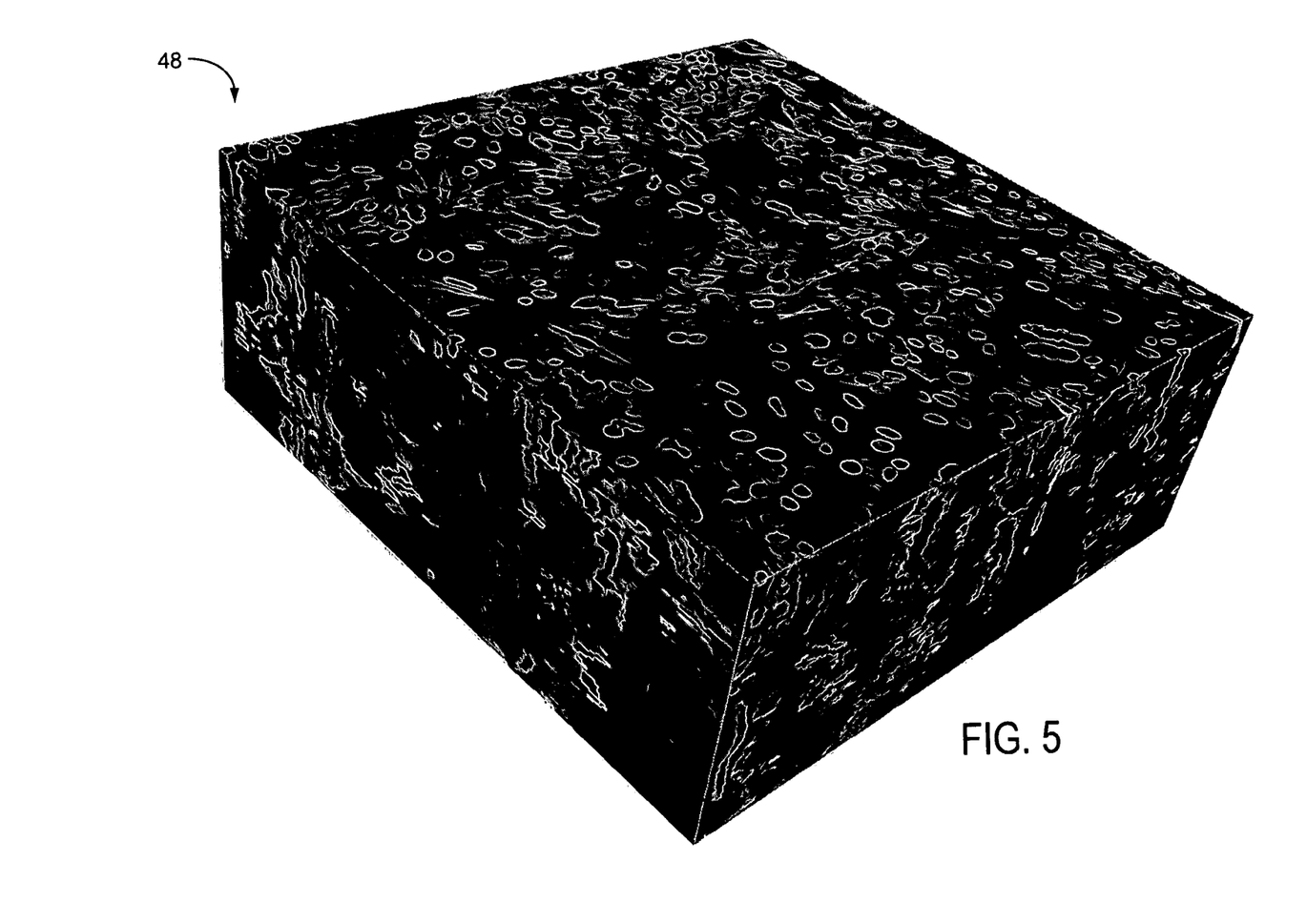
FIG. 5 is an exemplary three-dimensional cell image volume in accordance with the present technique.

FIG. 5 is shows an exemplary three-dimensional image volume 48. The G2 phase nuclei can be seen as dark tunnels that carve through the volume. Because a normally propagating cell spends the majority of its time in this phase, segmenting these dark tunnels facilitates classification of the cells within the cell cycle. It is envisioned that an operator may select individual sections or views of the three-dimensional image volume 48 for more detailed analysis. For example, because the three-dimensional image volume 48 is formed from a series of time-lapse two-dimensional images, an operator may be able to select individual two-dimensional images 44 from within the three-dimensional image volume 48 in order to view a population of cells at a particular temporal stage. The operator may then scroll through the individual two-dimensional images 44 by moving through space in the three-dimensional image volume 48. Alternatively, an operator may view an individual cell over time in the three-dimensional image volume 48. Such a view may be a visually coded tree (see FIG. 6), linking the individual cell to its daughter cells. An operator may move between tree views of individual cells to the three-dimensional image volume 48 or to a series of two-dimensional images 44. Additionally, an operator may also move from a representational view of a three-dimensional image volume 48, visually coded tree, or a two-dimensional image 44 to obtain data that relates to either an individual cell or a population of cells. For example, an operator may switch from a tree view to a data file that includes data relating to the parent and daughter cells represented in the tree. The three-dimensional image volume 48 may allow an operator to view multiple visual representations of the imaging data in order to facilitate analysis and tracking of cell cycle progression. Further, the three-dimensional image volume 48 may also allow an operator to directly access the raw data obtained from the images for further processing.

Figure 6:
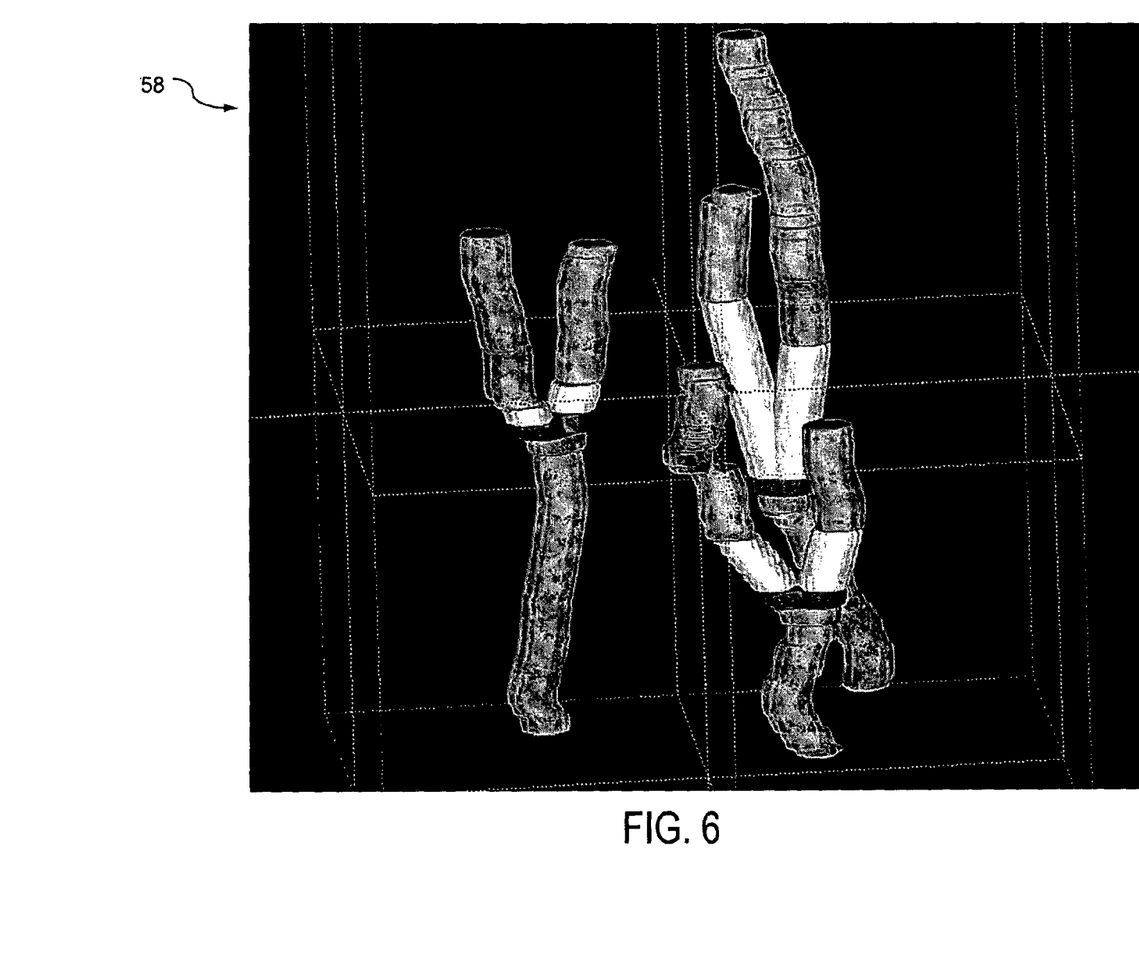
FIG. 6 is an exemplary tree display indicating at which point during the cell cycle progression the segmenting and linking steps are performed.

FIG. 6. is a representation of cell cycle phases as a visually coded tree. As depicted, the present techniques may follow the progress of an individual cell with in a three-dimensional image volume 48. Shown are the coded trees of three parent cells and their corresponding daughter cells. The algorithms first segment the G2 phase, which is the longest lasting, and then link across the other phases to locate the corresponding daughter cells. To obtain a full three-dimensional tree structure, a subsequent step connects the corresponding G2 phase segmentations together by tracking across the other phases. In one embodiment, parent and daughter cells were associated by minimizing a Euclidean distance.

Figure 7:
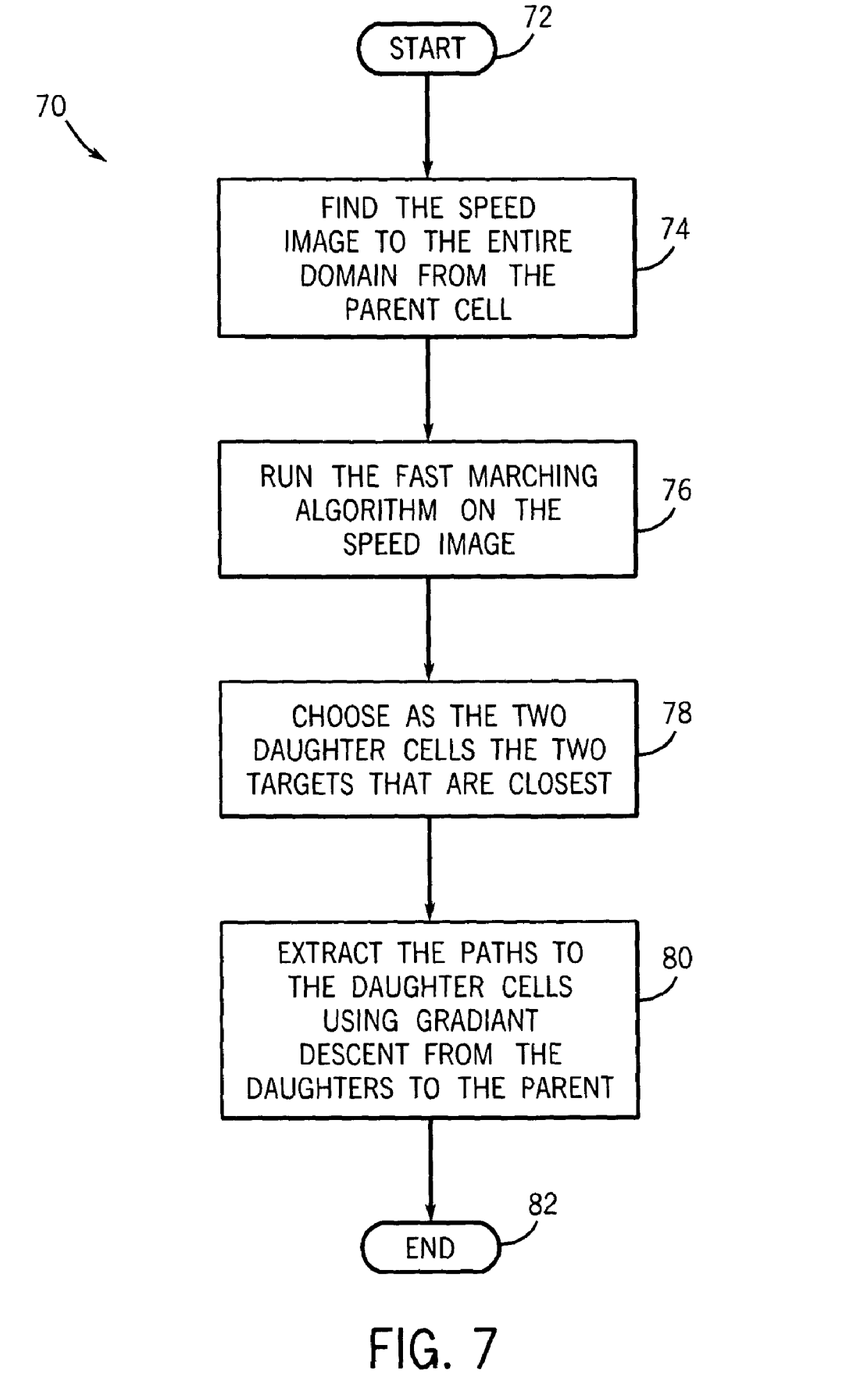
FIG. 7 is a flow chart depicting a process for performing a fast marching technique on cell images.

In another embodiment, a fast marching method may be used to associate parent and daughter cells. FIG. 7 is a flow chart describing such a process 70. To implement this model, a starting point is chosen at the end of the G2 phase of a parent cell. At start 72, control is passed to step 74, in which a processor finds the speed image to the entire domain from the parent cell. The fast marching algorithm is performed in the speed image in step 76, allowing a processor to choose the two closest daughter cells to associate with the parent in step 76. At step 80, the algorithm may extract the paths to the daughter cells using gradient descent from the daughters to the parent. After end step 82, this algorithm results in a time-crossing map for every point in the image, and the daughter cells of the parent may be determined by finding the two segmented G2 phases whose starting points have the smallest times.

In the process of solving the Eikonal equation, the gradients can also be generated. Using these gradients, the minimal path from the parent to the two daughters can then be determined by running a gradient descent procedure from the daughters to the parent as described earlier. More specifically, the fast marching method is a method for solving a time arrival equation described by the Eikonal equation:

$$|\nabla T|F = \sqrt{\left(\frac{\partial T}{\partial x}\right)^2 + \left(\frac{\partial T}{\partial y}\right)^2 + \left(\frac{\partial T}{\partial z}\right)^2} F(x, y, z) = 1$$

in three-dimensions where F(x,y,z) is the speed map or cost function and T is the resulting time-crossing map for every point in the domain. Given a starting point, the fast marching method builds the solution outwards from the boundary condition choosing the smallest time at each step of its evolution. Because it only allows the evolving curve to pass each point once, it can be solved without iteration, which makes it very fast. The domain in which the object travels may also have a weighted metric so that the front can evolve faster in some areas than others. This method can be used to solve path planning problems, where the goal is to find the shortest path from an initial position to a final position. The fast marching method is used to find the time-crossing map for the curve evolving from a starting point A. Then, given any point Z in the domain, the shortest path is constructed by propagating from Z to A using gradient descent by solving the ordinary differential equation $dx/dt = -\psi T$ given the initial condition $x(0)=Z$. This method has been used for such applications as finding the optimal path for moving objects through mazes where the cost function (binary in this case) is defined to be zero at walls and unity everywhere else. In the path planning problem, the most important part is to define an appropriate cost function. Since the cell phase in cell cycle phase marker datasets is defined by the level of fluorescence of the marker, the cost function is based on nuclear intensity. In this model, the cost function switches from emphasizing bright nuclei to dark nuclei along the tracks. In other words, the cost is low (fast moving) in bright nuclei and high in dark areas at the beginning of the track and gradually switches to a low cost for dark nuclei and high cost for bright areas. The speed function is found by mapping the intensities with a sigmoid function. After the fast marching algorithm 70 is run, the segmented "tunnels" in the three-dimensional image volume 48 are linked to their daughter cells in order to create rough "tree images" as shown in FIG. 6.

Figure 8:
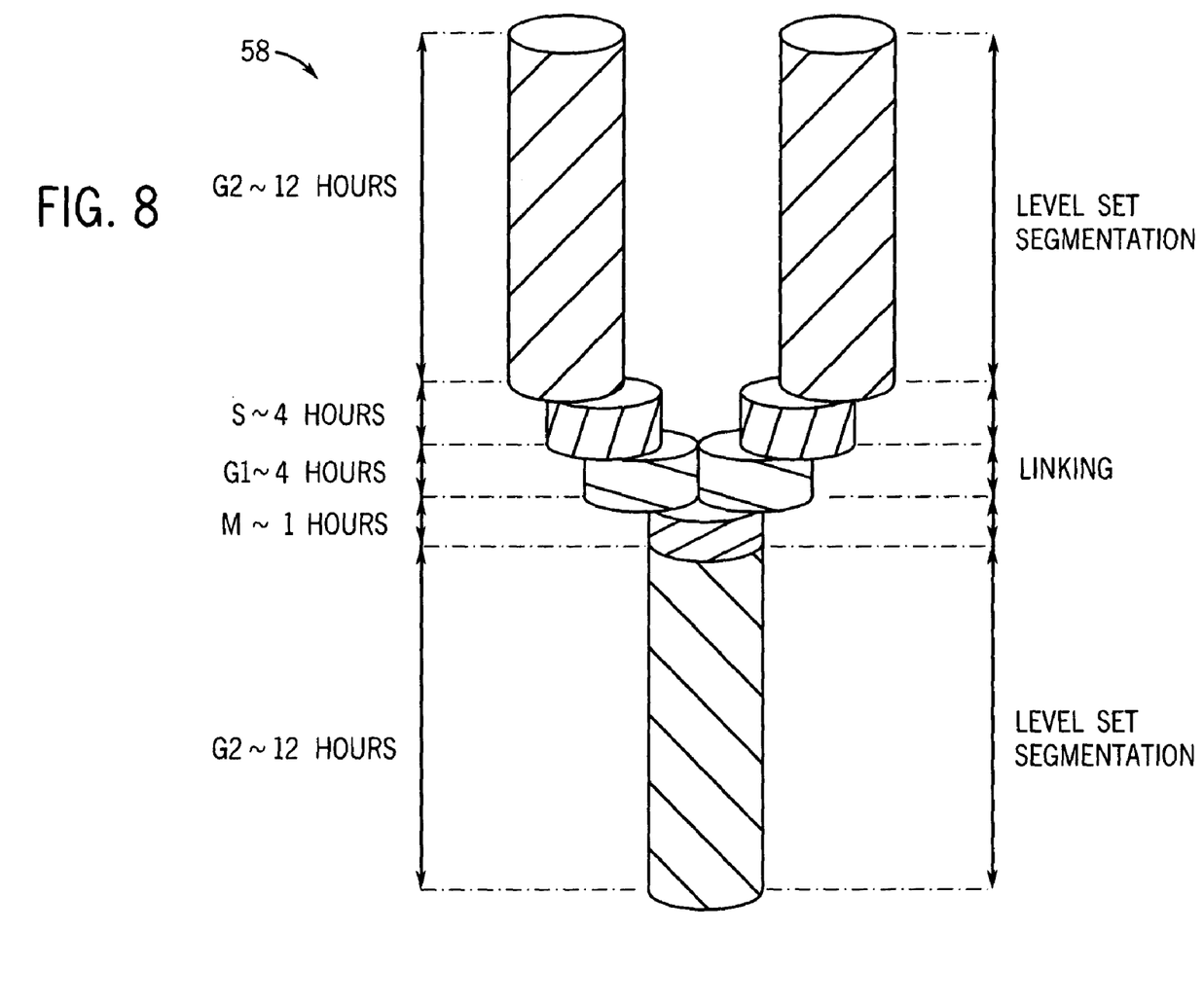
FIG. 8 is an exemplary coded tree display illustrating progression of a parent cell and daughter cells through the cell cycle over time.
Figure 9:
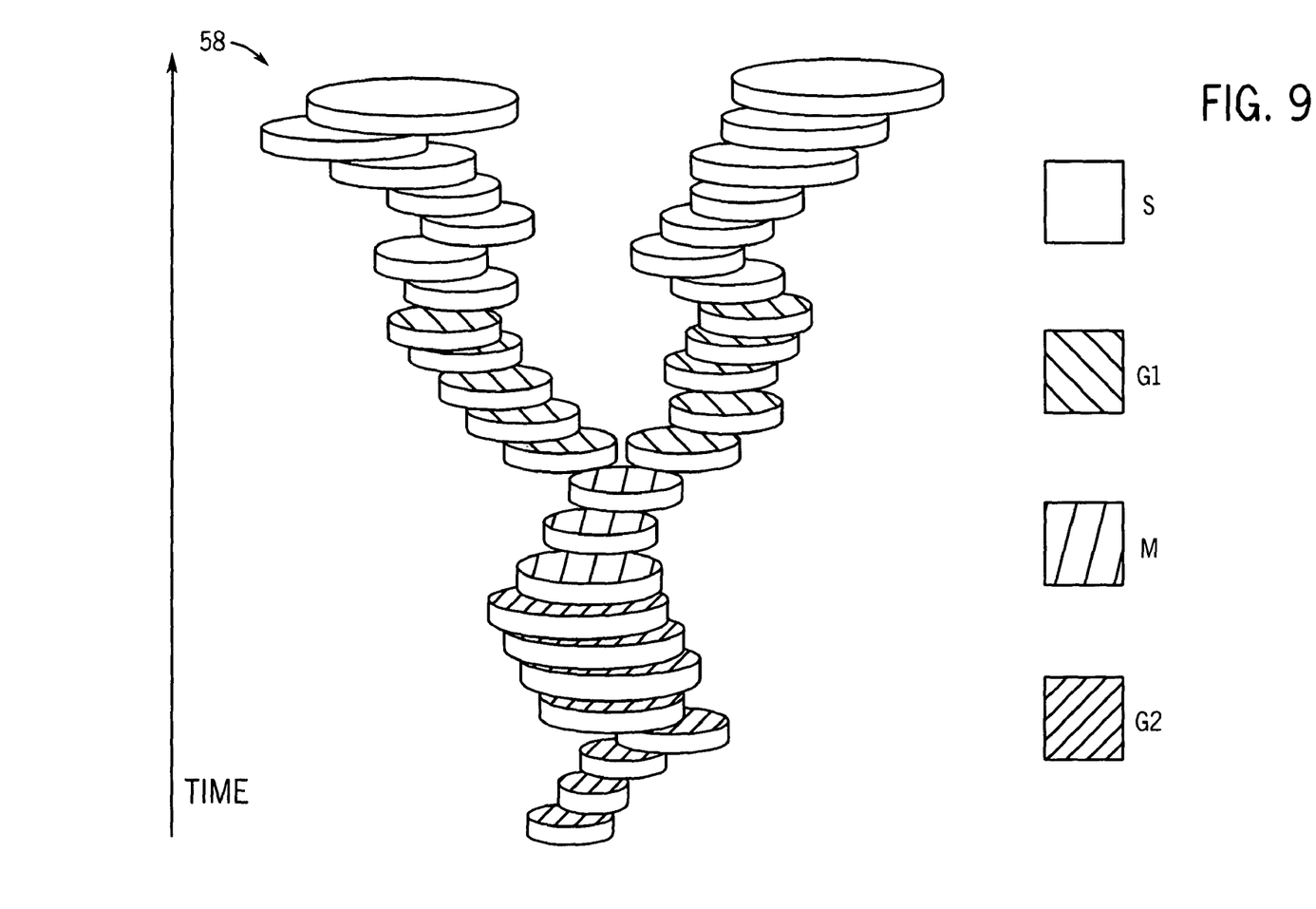
FIG. 9 is an alternate tree display showing progression of a parent cell and daughter cells through the cell cycle over time.

FIG. 8 and FIG. 9 are alternate schematic tree displays for studying the effects of antiproliferative drugs on the progression of the cell cycle. Such tree and branch representations of high complexity data may enable visualization of variations in many parameters that characterize cell cycle modification. Such variations may include intra-lineage and inter-lineage changes in duration of cell cycle phases (length of colour on branch), cell cycle blocks (extended tree branch in single color), accelerated or delayed mitosis (distance between branch nodes), nuclear morphology (branch thickness), DNA endoreduplication (replication of DNA during S phase), or nuclear fragmentation (splitting of branches to twigs) and cell death (branch termination). In FIG. 8, the image shows a single cell splitting over time, where time is the vertical axis and the phases are coded. The tree representation facilitates the computation of quantitative measurements such as the time the cell spends in each phase of the cell cycle, time between mitotic events, rate of mitosis etc. FIG. 9 is a schematic image showing individual "slices" that may correspond to each original two-dimensional image. In any case, such displays may provide useful information to a researcher about the effects of a potential therapeutic compound on cell cycle progression. For example, as each three-dimensional image volume 48 may generate multiple trees, these trees may be averaged to provide a composite tree image detailing the average length of time in each cell cycle. Such a composite tree may be compared to other trees, such as controls, in order to provide an estimate of cell cycle alteration.

While only certain features of the invention have been illustrated and described herein, many modifications and changes will occur to those skilled in the art. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for automatically tracking a cell cycle phase of a cell, the method comprising the steps of:
   generating a three-dimensional volume from a plurality of two-dimensional images of one or more cells; and
   performing a segmentation analysis of the three-dimensional volume to classify the one or more cells into a G1, S, G2, or M cell cycle phase over time.

2. The method of claim 1, comprising smoothing the two-dimensional images to reduce noise while retaining edges of the nuclei.

3. The method of claim 1, comprising seeding the two-dimensional images to characterize at least one nucleus.

4. The method of claim 1, wherein performing the segmentation analysis comprises steps of:
   identifying bright and dark tubes within the three-dimensional volume;
   performing a three-dimensional segmentation using level sets on the dark tubes to classify cells into a G2 cell cycle phase; and
   classifying the bright tubes into G1, M, or S phase cell cycle phases using linking analysis.

5. The method of claim 1, wherein performing the linking analysis comprises a Euclidean distance metric for identifying a daughter cell of the one or more cells.

6. The method of claim 1, wherein performing the linking analysis comprises a fast marching method for identifying a daughter cell of the one or more cells.

7. The method of claim 1, comprising generating an image output of the cell cycle progression of the one or more cells.

8. The method of claim 1, wherein the one or more cells is labeled with an imaging agent.

9. The method of claim 8, wherein the imaging agent comprises a dynamic cellular marker adapted to change position in the cell during cell cycle progression.

10. The method of claim 1, wherein the two-dimensional images are obtained from live cells using one or more imaging channels.

11. The method of claim 1, wherein the one or more cells is a mammalian cell.

12. The method of claim 1, wherein the one or more cells has been treated with a cell cycle altering compound.

13. The method of claim 1, comprising performing a quantitative measurement of a rate of mitosis of the one or more cells, a time between mitotic events of the one or more cells, or a time spent by the one or more cells in the G1, M, or S phase cell cycle phase.

14. A computer readable medium for automatically tracking a cell cycle phase of a cell comprising:
   code for generating a three-dimensional volume from a plurality of two-dimensional images of one or more cells; and
   code for performing a segmentation analysis of the three-dimensional volume to classify the one or more cells into a G1, S, G2, or M cell cycle phase over time.

15. The computer readable medium of claim 14, comprising code for smoothing the two-dimensional images to reduce noise.

16. The computer readable medium of claim 14, comprising code for seeding the two-dimensional images to characterize at least one nucleus.

17. The computer readable medium of claim 14, wherein the code for performing the segmentation analysis comprises:
   code for identifying bright and dark tubes within the three-dimensional volume;
   code for performing a three-dimensional segmentation using level sets on the dark tubes to classify cells into a G2 cell cycle phase; and
   code for classifying the bright tubes into G1, M, or S phase cell cycle phases using linking analysis.

18. The computer readable medium of claim 14, wherein the code for performing the linking analysis comprises code for a Euclidean distance metric for identifying a daughter cell of the one or more cells.

19. The computer readable medium of claim 14, wherein the code for performing the linking analysis comprises code for a fast marching method for identifying a daughter cell of the one or more cells.

20. The computer readable medium of claim 14, comprising code for generating an image output of the cell cycle progression of the one or more cells.

21. The computer readable medium of claim 14, comprising code performing a quantitative measurement of a rate of mitosis of the one or more cells, a time between mitotic events of the one or more cells, or a time spent by the one or more cells in the G1, M, or S phase cell cycle phase.

22. An image analysis system for automatically tracking a cell cycle phase of a cell comprising:
   an imager;
   a processor adapted to receive a plurality of two-dimensional images of one or more cells from the imager, the processor adapted to run instructions for:
   generating a three-dimensional volume from the plurality of two-dimensional cell images; and
   performing a segmentation analysis of the three-dimensional volume to classify the one or more cells into a G1, S, G2, or M cell cycle phase over time.

23. The image analysis system of claim 22, wherein the processor is adapted to run instructions for smoothing the two-dimensional images to reduce noise.

24. The image analysis system of claim 22, wherein the processor is adapted to run instructions for seeding the two-dimensional images to characterize at least one nucleus.

25. The image analysis system of claim 22, wherein the processor is adapted to run instructions for:
   identifying bright and dark tubes within the three-dimensional volume;
   performing a three-dimensional segmentation using level sets on the dark tubes to classify cells into a G2 cell cycle phase; and
   classifying the bright tubes into G1, M, or S phase cell cycle phases using linking analysis.

26. The image analysis system of claim 22, wherein the instructions for performing the linking analysis comprise code for a Euclidean distance metric for identifying a daughter cell of the one or more cells.

27. The image analysis system of claim 22, wherein the instructions for performing the linking analysis comprises code for a Fast Marching Method for identifying a daughter cell of the one or more cells.

28. The image analysis system of claim 22, wherein the processor is adapted to run instructions for generating an image output of the cell cycle progression of the one or more cells.

29. The image analysis system of claim 22, wherein the imager comprises a confocal microscope.

30. The image analysis system of claim 22, comprising a display adapted to display information related to the segmentation analysis.

31. The image analysis system of claim 22, wherein the processor is adapted to run instructions for performing a quantitative measurement of a rate of mitosis of the one or more cells, a time between mitotic events of the one or more cells, or a time spent by the one or more cells in the G1, M, or S phase cell cycle phase.

32. A method of screening the effect of a compound on cell cycle progression, the method comprising the steps of:
   treating one or more cells with the compound;
   generating a three-dimensional volume from a plurality of two-dimensional images of the one or more cells;
   performing a segmentation analysis of the three-dimensional volume to characterize the progression of the one or more cells into a G1, S, G2, or M cell cycle phase over time; and
   comparing the progression with a control.

33. The method of claim 32, wherein comparing the progression with the control comprises comparing an image output of the cell cycle progression of the one or more cells with the control.

34. The method of claim 32, wherein comparing the progression with the control comprises retrieving stored data related to the control.

35. The method of claim 32, wherein the control comprises a cell cycle progression of at least one untreated cell.

36. The method of claim 32, wherein the control comprises a cell cycle progression of a cell treated with a known cell cycle blocking compound.

37. A computer readable medium for displaying progression of a cell cycle phase of a cell comprising:
   code for generating a three-dimensional volume from a plurality of two-dimensional images of one or more cells;
   code for performing a segmentation analysis of the three-dimensional volume to classify the one or more cells into a G1, S, G2, or M cell cycle phase over time;
   code for performing a linking analysis of the G1, S, G2, or M cell cycle phases of the one or more cells; and
   code for displaying an image including the G1, S, G2, or M cell cycle phase of the one or more cells over time.

38. The computer readable medium of claim 37, wherein the code for performing the linking analysis comprises code for a Euclidean distance metric for identifying a daughter cell of the one or more cells.

39. The computer readable medium of claim 37, wherein the code for performing the linking analysis comprises code for a fast marching method for identifying a daughter cell of the one or more cells.

40. The computer readable medium of claim 37, wherein the code for generating an image output of the cell cycle progression of the one or more cells comprises instructions for displaying the cell cycle progression of a parent cell and two daughter cells.

41. The computer readable medium of claim 37, wherein the code for generating an image output of the cell cycle progression of the one or more cells comprises instructions for displaying each cell cycle phase as a different color.

42. The computer readable medium of claim 37, comprising code for displaying the location of the one or more cells within the three-dimensional volume.

43. The computer readable medium of claim 37, wherein the code for generating an image output of the cell cycle progression of the one or more cells comprises instruction for displaying a tree image of cell cycle progression.

44. The computer readable medium of claim 37, comprising code for performing a quantitative measurement of a rate of mitosis of the one or more cells, a time between mitotic events of the one or more cells, or a time spent by the one or more cells in the G1, M, or S phase cell cycle phase.

* * * * *